United States Patent
Niinuma et al.

(10) Patent No.: US 10,082,879 B2
(45) Date of Patent: Sep. 25, 2018

(54) HEAD MOUNTED DISPLAY DEVICE AND CONTROL METHOD

(71) Applicant: FUJITSU LIMITED, Kawasaki-shi, Kanagawa (JP)

(72) Inventors: Koichiro Niinuma, Kawasaki (JP); Toshiyuki Yoshitake, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/363,927

(22) Filed: Nov. 29, 2016

(65) Prior Publication Data
US 2017/0153713 A1 Jun. 1, 2017

(30) Foreign Application Priority Data
Nov. 30, 2015 (JP) ................................. 2015-233974

(51) Int. Cl.
*G06F 3/01* (2006.01)
*G06T 7/00* (2017.01)
*G09G 5/377* (2006.01)

(52) U.S. Cl.
CPC ............ *G06F 3/017* (2013.01); *G06T 7/0042* (2013.01); *G09G 5/377* (2013.01); *G06T 2210/62* (2013.01); *G09G 2320/068* (2013.01); *G09G 2340/125* (2013.01)

(58) Field of Classification Search
CPC .................................................... G06T 19/006
See application file for complete search history.

(56) References Cited

U.S. PATENT DOCUMENTS

| 6,144,366 A | 11/2000 | Numazaki et al. |
| 2005/0212911 A1* | 9/2005 | Marvit .................... G06F 3/017 348/154 |
| 2006/0044327 A1* | 3/2006 | Okuno .................. G06F 3/0304 345/626 |

(Continued)

FOREIGN PATENT DOCUMENTS

| JP | H 10-177449 A | 6/1998 |
| JP | 2012-079177 A | 4/2012 |
| JP | 2014-072575 A | 4/2014 |

OTHER PUBLICATIONS

Leap Motion Screenshot, Image Hands: Moving Demo, https://developer.leapmotion.com/gallery/image-hands-moving-demo, (1 page).

(Continued)

*Primary Examiner* — Jitesh Patel
(74) *Attorney, Agent, or Firm* — Oblon, McClelland, Maier & Neustadt, L.L.P.

(57) ABSTRACT

A device includes a display configured to display images in accordance with a virtual viewpoint position in a virtual reality space, a distance sensor configured to acquire distance information of a distance in a measuring range in a real space from the distance sensor to a hand of a user wearing the device, and a processor. The processor is configured to acquire a hand image of a hand region based on the distance information, the hand region corresponding to the hand, detect a shape of the hand and an inclination of the hand from the hand image, generate, in accordance with the inclination, when the shape of the hand is a first shape, a display image in which the virtual viewpoint position in the virtual reality space has been moved to another virtual viewpoint position, and control the display to display the display image.

19 Claims, 16 Drawing Sheets

(56) References Cited

U.S. PATENT DOCUMENTS

| | | | | |
|---|---|---|---|---|
| 2009/0102788 | A1* | 4/2009 | Nishida | G06F 3/014 345/158 |
| 2010/0149090 | A1* | 6/2010 | Morris | H04L 67/42 345/156 |
| 2012/0249741 | A1* | 10/2012 | Maciocci | G06F 3/011 348/46 |
| 2013/0162535 | A1* | 6/2013 | Nishida | G06F 3/014 345/158 |
| 2013/0336528 | A1* | 12/2013 | Itani | G06F 3/017 382/103 |
| 2014/0292645 | A1* | 10/2014 | Tsurumi | G06F 3/011 345/156 |
| 2014/0306891 | A1* | 10/2014 | Latta | G06F 3/017 345/158 |
| 2015/0138232 | A1* | 5/2015 | Sugimoto | G06F 3/1205 345/633 |
| 2015/0312559 | A1 | 10/2015 | Ueno et al. | |
| 2015/0331493 | A1* | 11/2015 | Algreatly | G06F 3/017 345/156 |
| 2015/0363001 | A1* | 12/2015 | Malzbender | G06F 3/017 706/18 |
| 2017/0060230 | A1* | 3/2017 | Faaborg | G06F 3/011 |

OTHER PUBLICATIONS

Guido Maria Re, et al., A Natural User Interface for Navigating in Organized 3D Virtual Contents, VAMR 2014, Part I, LNCS 8525, pp. 93-104, 2014, © Springer International Publishing Switzerland 2014, (12 pages).

\* cited by examiner 1A    1B    1C    1D

HEAD MOUNTED DISPLAY DEVICE AND CONTROL METHOD

CROSS-REFERENCE TO RELATED APPLICATION

This application is based upon and claims the benefit of priority of Japanese Patent Application No. 2015-233974, filed in Japan on Nov. 30, 2015, the entire contents of which is hereby incorporated by reference.

FIELD

The embodiment discussed herein is related to image processing.

BACKGROUND

Head Mounted Displays (HMDs) have been prevalent in recent years. An HMD is a display device that is mounted on a user's head and displays computer graphics (CG) video and/or remote video to the user, which provides the user with a virtual reality experience.

Since the eyes of the user wearing a whole-screen type HMD are covered with a display, it is difficult for the user wearing the HMD to operate an input device such as a keyboard and thus difficult to change a viewpoint within a video display. Thus, there is a demand for a technique that allows the user wearing an HMD to change a viewpoint within a video display by making a predetermined gesture or the like.

A first related art will be described. The first related art enables six-direction navigation by using a fixed sensor such as a Kinect (Registered Trademark) to recognize a gesture based on the motion of a user's arm. FIG. 15 is a diagram illustrating the first related art. For example, as illustrated in a gesture 1A, upon the user stopping their arm at a position, a device receives an instruction to stop motion. As illustrated in a gesture 1B, upon the user moving their arm position to the left, the device receives an instruction of a motion in the left direction and, upon the user moving their arm position to the right, the device receives an instruction of a motion in the right direction. As illustrated in a gesture 1C, upon the user moving their arm position forward, the device receives an instruction of a forward motion and, upon the user moving their arm position backward, the device receives an instruction of a backward motion. As illustrated in a gesture 1D, the user moving their arm position upward, the device receives an instruction of an upward motion, and the user moving their arm position downward, the device receives an instruction of a downward motion.

A second related art will be described. The second related art discloses a technique that determines whether or not both hands of a user are present within a capturing range of a camera of an HMD. When both hands are present within the capturing range of the camera, the viewpoint position is moved in a forward direction. FIG. 16 is a diagram illustrating the second related art. As illustrated in FIG. 16, in the second related art, upon the user moving both hands forward, both hands are displayed on a screen, and the viewpoint position is moved forward. In contrast to the first related art, since the second related art involves only determination as to whether or not both hands are present, the user wearing the HMD is able to move the viewpoint position forward.

In addition, related techniques are disclosed in Japanese Laid-open Patent Publication No. 2012-79177, Japanese Laid-open Patent Publication No. 10-177449, and Japanese Laid-open Patent Publication No. 2014-72575, for example.

SUMMARY

According to an aspect of the invention, a head mounted display (HMD) device includes a display and configured to display images in accordance with a virtual viewpoint position in a virtual reality space, a distance sensor and configured to acquire distance information of a distance in a measuring range in a real space from the distance sensor to a hand of a user wearing the HMD device, and a processor. The processor is configured to acquire a hand image of a hand region based on the distance information acquired from the distance sensor, the hand region corresponding to the hand of the user, detect a shape of the hand and an inclination of the hand from the hand image, generate, in accordance with the inclination, when the shape of the hand is a first shape, a display image in which the virtual viewpoint position in the virtual reality space has been moved to another virtual viewpoint position, and control the display to display the display image.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT

Figure 15:
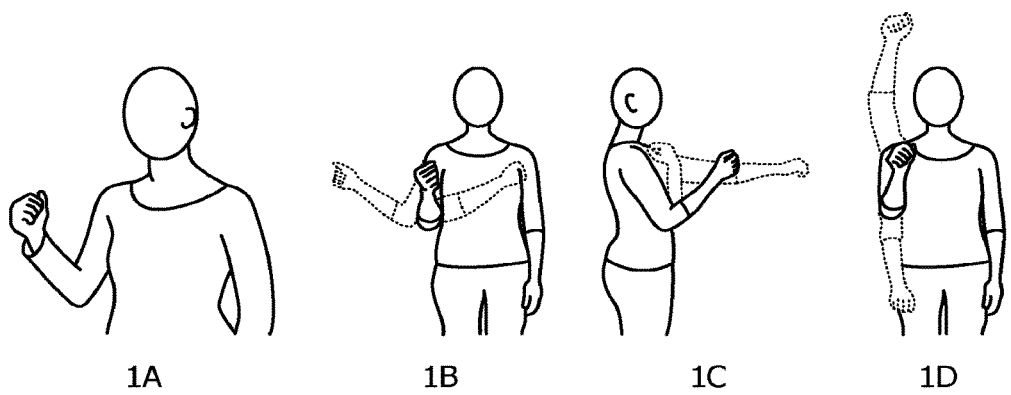
FIG. 15 is a diagram illustrating the first related art.

Since the first related art is not intended to be applied to an HMD, let us assume a case where the first related art is applied to an HMD and a situation where a viewpoint position within an image has to be changed. Since a camera mounted in the HMD is attached so as to capture a region in a viewpoint direction with respect to the user's head, a capturing range may include hands but does not include arms. Thus, a motion of the arm is not detected and it is therefore difficult to provide an instruction of a motion direction of the viewpoint. For example, it is difficult to recognize the gestures 1B and 1D illustrated in FIG. 15.

Note that, as illustrated in the gesture 1C (FIG. 15) of the first related art, when the arm is moved forward and/or backward, it is possible to include the arm within a capturing range of the camera. Since physiques differ among respective users, however, the length of an arm differ among respective users and it is therefore difficult to estimate a motion of an arm reaching out and returning based on the distance between the hand and the camera, for example.

Figure 16:
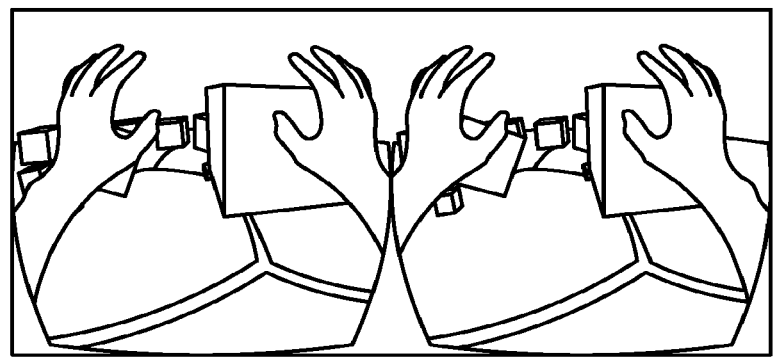
FIG. 16 is a diagram illustrating the second related art.

Further, since the second related art involves merely determination as to whether or not both hands are present, a possible motion direction of a viewpoint position is limited to a forward direction, for example. Further, as illustrated in FIG. 16, when the user places both hands forward, both of the user's hands are displayed on the screen, and thus portions of the field of view may be obstructed by the hands within the field of view.

As discussed above, the related arts described above have a problem of being unable to recognize multiple types of gestures and a problem of a viewable area being obstructed by the user's hands.

In one aspect, a technique disclosed in the embodiment has the goal of enabling determination or gestures and recognition of a region that would otherwise be obstructed by a hand and thus allowing for an intuitive operation.

The embodiment of an image processing device, an image processing method, and an image processing program disclosed by the present application will be described below in detail based on the drawings. Note that the disclosure is not limited by the embodiment.

Embodiment

Figure 1:
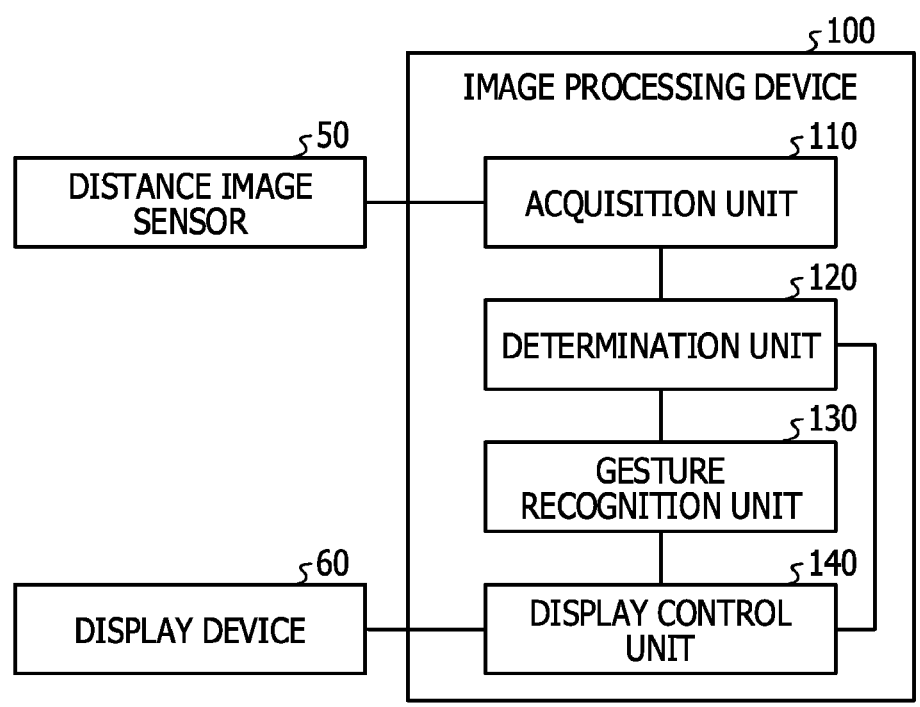
FIG. 1 is a functional block diagram illustrating a configuration of an image processing device according to the embodiment.

FIG. 1 is a functional block diagram illustrating a configuration of an image processing device according to the embodiment. The image processing device 100 is incorporated in a Head Mounted Display (HMD) (not illustrated), for example. The image processing device 100 is connected to a distance image sensor 50 and a display device 60 that are mounted in the HMD. The distance image sensor 50 and the display device 60 are fixed to the HMD by being built into the HMD or being attached to the HMD. A user can wear the HMD incorporating the image processing device 100 on the head.

The distance image sensor 50 is a sensor that measures the distance between the distance image sensor 50 and an object included in a capturing range of the distance image sensor 50 and outputs the result as distance information. Further, the distance image sensor 50 has a camera and captures an image in a capturing range. The capturing direction of the distance image sensor 50 corresponds to the viewing direction of the user.

The distance image sensor 50 measures the distance between the distance image sensor 50 and an object based on a Time of Flight (TOF) scheme and outputs the result as distance information. Distance information includes respective distances from the distance image sensor 50 to respective points on an object.

The distance image sensor 50 outputs, to the image processing device 100, distance image information that combines distance information with image information within a range captured by the camera. For example, the distance image information is information that associates a point on an image with a distance from the distance image sensor 50 to a point in a real space corresponding to the point of the image. Further, the distance image information may be a distance image that represents the distance between an object and a distance sensor as a pixel value.

The display device 60 is a display device that displays video information that is output from the image processing device 100.

The image processing device 100 has an acquisition unit 110, a determination unit 120, a gesture recognition unit 130, and a display control unit 140. The acquisition unit 110, the determination unit 120, and the gesture recognition unit 130 correspond to a recognition unit.

The acquisition unit 110 is an acquisition unit that acquires distance image information from the distance image sensor 50. The acquisition unit 110 outputs the acquired distance image information to the determination unit 120.

The determination unit 120 is a processing unit that identifies user's fingertips and finger bases based on the distances between points on an object and a reference point included in distance image information and, thereby, determines finger regions and then determines a hand region based on the determined finger regions. The determination unit 120 outputs information of a hand region to the gesture recognition unit 130.

A process of the determination unit 120 will be specifically described below. The determination unit 120 performs a process of cutting out a hand region candidate, a process of smoothing an outline of the hand region candidate, a process of determining a fingertip candidate point and a finger base candidate point, a process of determining a finger region, and a process of determining whether or not the hand region candidate is a hand region.

A process of cutting out a hand region candidate by the determination unit 120 will be described. The determination unit 120 cuts out, as a hand region candidate, an object present in a region whose distance from the distance image sensor 50 is less than a threshold.

Figure 2:
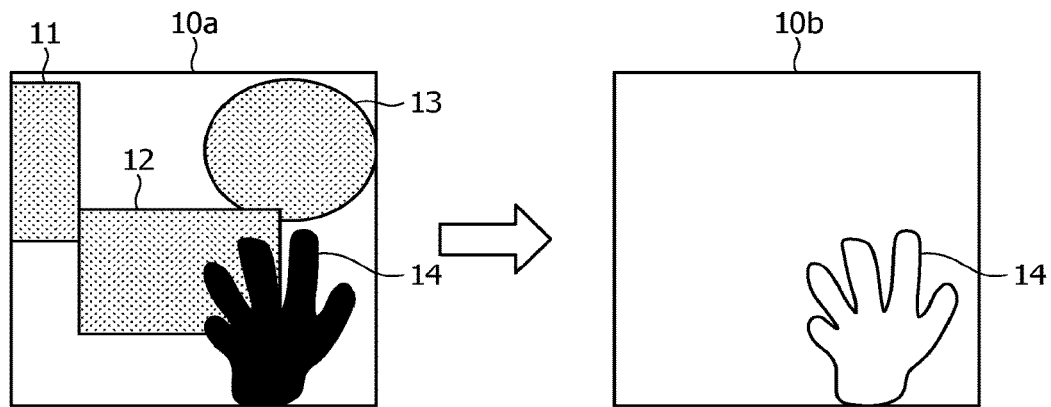
FIG. 2 is a diagram illustrating a process of cutting out a hand region candidate.

FIG. 2 is a diagram illustrating a process of cutting out a hand region candidate. In FIG. 2, distance image information 10a includes objects 11, 12, 13, and 14, for example. Object 14 of the objects 11 to 14 is present in a region whose distance from the distance image sensor 50 is less than a threshold. In this case, the determination unit 120 cuts out the object 14 from the distance image information 10a to generate distance image information 10b.

A process of smoothing an outline of a hand region candidate by the determination unit 120 will be described. For the distances related to the distance image information in which the hand region candidate has been cut out, the determination unit 120 performs smoothing by employing a weighted average or the like of neighboring outlines.

Figure 3:
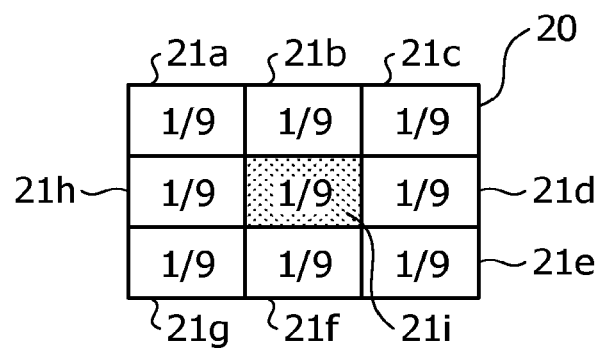
FIG. 3 is a diagram illustrating a smoothing process.

FIG. 3 is a diagram illustrating a smoothing process. The determination unit 120 applies a smoothing filter 20 to points at distances corresponding to respective points in the whole distance image information to smooth the distance image information. The smoothing filter 20 is a filter that calculates a distance value of a center pixel 21$i$ based on Equation (1).

The distance value of the center pixel 21$i$=⅛×(distance value of pixel 21$a$+distance value of pixel 21$b$+distance value of pixel 21$c$+distance value of pixel 21$d$+distance value of pixel 21$e$+distance value of pixel 21$f$+distance value of pixel 21$g$+distance value of pixel 21$h$) (1)

Figure 4:
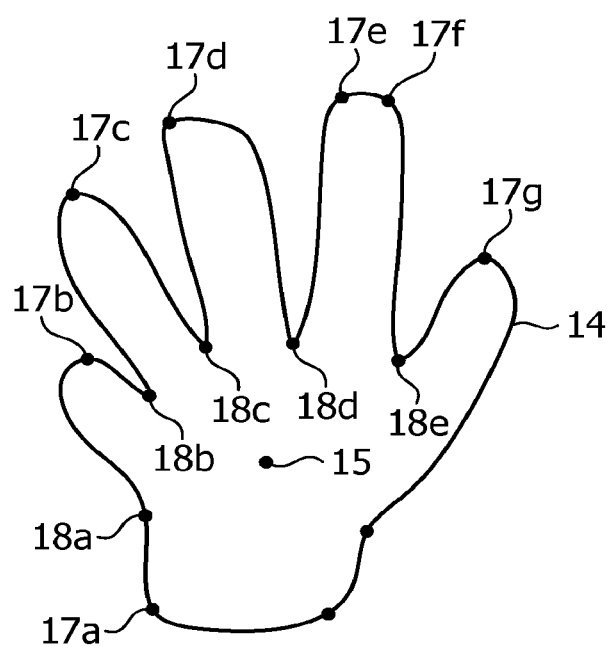
FIG. 4 is a diagram (1) illustrating a process of determining fingertip candidate points and finger base candidate points.
Figure 5:
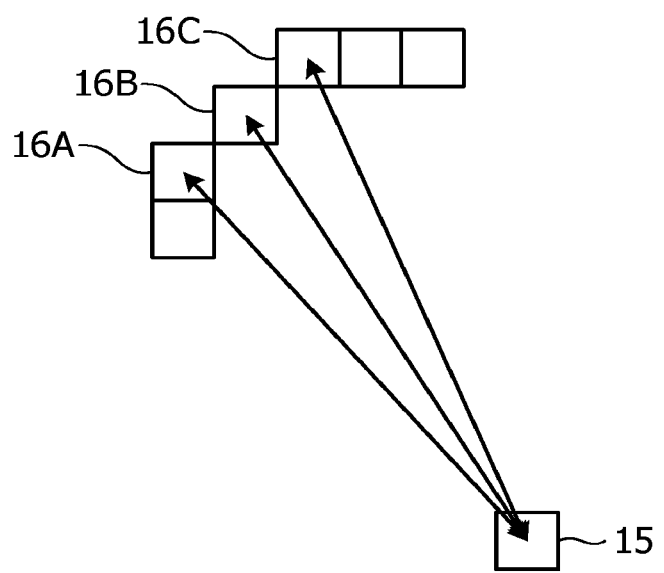
FIG. 5 is a diagram (2) illustrating a process of determining fingertip candidate points and finger base candidate points.

A process of determining fingertip candidate points and finger base candidate points by the determination unit 120 will be described. FIG. 4 and FIG. 5 are diagrams illustrating a process of determining fingertip candidate points and finger base candidate points. The determination unit 120 sets a reference point 15 for a hand region candidate 14 included in the smoothed distance image information. As illustrated in FIG. 4, the determination unit 120 sets the center of gravity point of the hand region candidate 14 as the reference point 15, for example.

The determination unit 120 calculates points that satisfy the following first condition and second condition for all the points on an outline of the hand region candidate 14 and determines fingertip candidate points and finger base candidate points. In this example, a description will be provided by using a point 16A, a point 16B, and a point 16C on neighboring outlines as illustrated in FIG. 5. The distance between the reference point 15 and the point 16A is denoted as Da. The distance between the reference point 15 and the point 16B is denoted as Db. The distance between the reference point 15 and the point 16C is denoted as Dc.

When the following first condition is satisfied, the determination unit 120 determines the point 16B as a fingertip candidate point.

First condition: Da<Db and Db>Dc

When the second condition is satisfied, the determination unit 120 determines the point 16B as a finger base candidate point.

Second condition: Da>Db and Db<Dc

The determination unit 120 repeats the above process for all the points on the outline of the hand region candidate 14 of FIG. 4, for example, to determine fingertip candidate points 17$a$, 17$b$, 17$c$, 17$d$, 17$e$, 17$f$, and 17$g$ and further determine finger base candidate points 18$a$, 18$b$, 18$c$, 18$d$, and 18$e$.

The determination unit 120 compares positions of respective fingertip candidate points 17$a$ to 17$g$ and merges fingertip candidate points which have a distance therebetween that is less than a threshold. Further, the determination unit 120 compares the positions of respective finger base candidate points 18$a$ to 18$e$ and merges finger base candidate points which have a distance therebetween that is less than a threshold.

For example, since the distance between the fingertip candidate point 17$e$ and the fingertip candidate point 17$f$ is less than a threshold in the example illustrated in FIG. 4, the determination unit 120 merges the fingertip candidate point 17$e$ and the fingertip candidate point 17$f$. For example, the determination unit 120 merges the fingertip candidate point 17$e$ and the fingertip candidate point 17$f$ by leaving the fingertip candidate point 17$e$ and deleting the fingertip candidate point 17$f$. Note that the determination unit 120 may calculate an average distance between the distance regarding the fingertip candidate point 17$e$ and the distance regarding the fingertip candidate point 17$f$, define the calculated average distance as a distance regarding a new fingertip candidate point, and merge and delete the fingertip candidate points 17$e$ and 17$f$.

In the processes described above, detection of a finger base candidate point of an end finger is likely to be unstable and a finger base candidate point may not be properly detected. Therefore, the determination unit 120 may detect a finger base candidate point which has not been detected by the above process by further performing the following process.

Figure 6:
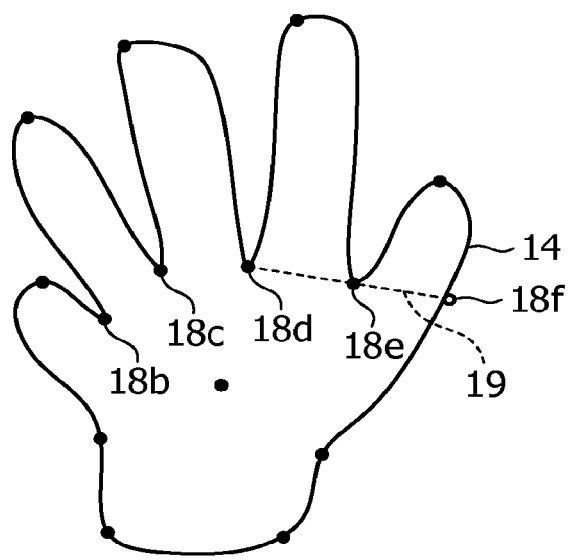
FIG. 6 is a diagram illustrating another process of detecting finger base candidate points.

FIG. 6 is a diagram illustrating another process of detecting finger base candidate points. The determination unit 120 calculates an intersection point of an outline of the hand region candidate 14 and a line running through a plurality of finger base candidate points, and detects the calculated intersection point as a finger base candidate point. For example, as illustrated in FIG. 6, the determination unit 120 detects, as a finger base candidate point, an intersection point 18$f$ of the outline of the hand region candidate 14 and a line 19 running through the finger base candidate points 18$d$ and 18$e$.

Note that the determination unit 120 may determine a hand region by a process described later and then detect as a finger base point an intersection point of an outline of the hand region candidate 14 and a line running through a finger base point included in the hand region. In the following description, a finger base point determined by using an intersection point of an outline of the hand region candidate 14 and a line running through a finger base point is referred to as a virtual finger base point.

Figure 7:
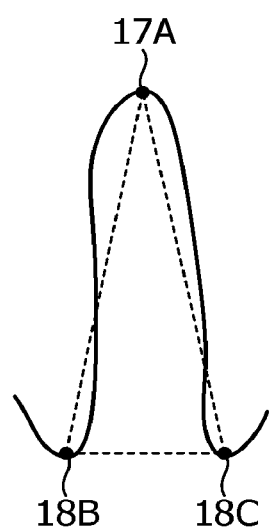
FIG. 7 is a diagram illustrating a process of determining finger regions.

A process of determining finger regions by the determination unit 120 will be described. FIG. 7 is a diagram illustrating a process of determining a finger region. The determination unit 120 determines, as a finger region, a region defined by a fingertip candidate point and two finger base candidate points that satisfies the following third condition and fourth condition.

As illustrated in FIG. 7, an example will be described by using the fingertip candidate point 17A and two finger base candidate points 18B and 18C. In this example, a triangle formed of the fingertip candidate point 17A and the two finger base candidate points 18B and 18C will be denoted as a triangle ABC. The determination unit 120 determines a shape of the triangle ABC and, when both of the third condition and the fourth condition are satisfied, determines a region of the triangle ABC as a finger region.

Third condition: the point 17A of the triangle ABC is an acute angle.

Fourth condition: the difference between the length of a side AB connecting the point 17A and the point 18B and the length of a side AC connecting the point 17A and the point 18C is less than a threshold.

When the triangle ABC illustrated in FIG. 7 satisfies the third condition and the fourth condition, the determination unit 120 determines a region occluded by the fingertip candidate point 17A and the two finger base candidate points 18B and 18C as a finger region. The determination unit 120 repeats the above process for other fingertip candidate points and another two related finger base candidate points to determine other finger regions. In the following description, a fingertip candidate point included in a finger region is referred to as a fingertip point, and a finger base candidate point included in a finger region is referred to as a finger base point.

Further, the determination unit 120 determines a triangle formed of a fingertip candidate point, a finger base candidate point, and a virtual finger base point and, when the determined triangle satisfies the third condition and the fourth condition, determines the triangle as a finger region.

A process by the determination unit 120 that determines whether or not a hand region candidate is a hand region will be described. The determination unit 120 determines whether or not a hand region candidate is a hand region based on the number of finger regions detected from the hand region candidate. For example, when the number of finger regions included in a hand region candidate is five, the determination unit 120 determines the hand region candidate as a hand region.

Figure 8:
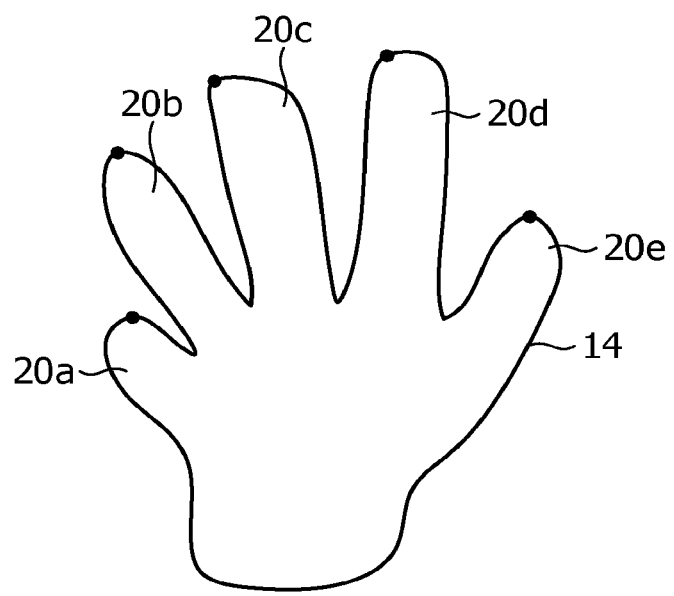
FIG. 8 is a diagram illustrating a process of determining a hand region.

FIG. 8 is a diagram illustrating a process of determining a hand region. For example, in the example illustrated in FIG. 8, it is assumed that finger regions 20a, 20b, 20c, 20d, and 20e have been determined from the hand region candidate 14. Since the number of the finger regions 20a to 20e is five (5), the determination unit 120 determines the hand region candidate 14 as a hand region.

The determination unit 120 outputs hand region information to the gesture recognition unit 130. The hand region information includes distances for fingertip points and distances for finger base points of respective finger regions included in a hand region. The distance for a fingertip point refers to a distance from the distance image sensor 50 to a fingertip point, and the distance for a finger base point refers to a distance from the distance image sensor 50 to a finger base point. Note that the determination unit 120 may convert a distance for the fingertip point and a distance for the finger base point into three-dimensional coordinates.

At the timing of having detected five finger regions, the determination unit 120 determines that the user has their fingers spread. The determination unit 120 notifies the display control unit 140 of information indicating that the user has spread their fingers.

The gesture recognition unit 130 is a processing unit that recognizes a type of gesture based on a differential value between a distance for a fingertip point and a distance for a finger base point included in a hand region. For example, when a value obtained by subtracting a distance for a finger base point from a distance for a fingertip point is a positive value, the gesture recognition unit 130 recognizes that a hand region is inclined forward. In contrast, when a value obtained by subtracting a distance for a finger base point from a distance for a fingertip point is a negative value, the gesture recognition unit 130 recognizes that a hand region is inclined backward.

Note that the gesture recognition unit 130 may calculate, from each of the finger regions, a differential value between a fingertip point and a finger base point included in a finger region and use an average value of a plurality of calculated differential values as the differential value described above. Alternatively, the gesture recognition unit 130 may select any one of the plurality of finger regions and calculate the differential value described above based on fingertip points and finger base points included in the selected finger region.

The gesture recognition unit 130 outputs information of a gesture recognition result to the display control unit 140. For example, information of a gesture recognition result includes information as to whether a hand region is inclined forward or backward and information of absolute values of differential values between distances for fingertip points and distances for fingertip points included in the hand region.

The display control unit 140 is a processing unit that causes the display device 60 to display image data of a virtual space in accordance with a viewpoint position of the user. For example, based on virtual space information that associates a viewpoint position with image data on a virtual space, the display control unit 140 causes the display device 60 to display image data of the virtual space. Based on information of a gesture recognition result, the display control unit 140 moves a user's viewpoint position in a virtual space to be displayed on the display device 60. For example, a viewpoint position is moved forward when a hand region is inclined forward, and a viewpoint position is moved backward when a hand region is inclined backward.

Further, when the shape of the user's hand becomes a predetermined shape, the display control unit 140 causes the display device 60 to display a superimposed image that superimposes image data of a virtual space in accordance with a user's viewpoint position and an shape of the user's hand. As a shape of the user's hand, the display control unit 140 uses one which is included in distance image information. The display control unit 140 determines a shape of the user's hand included in distance image information based on a hand region determined by the determination unit 120.

The above predetermined shape corresponds to a shape when the user spreads the fingers. When having acquired information indicating that the user has spread the fingers from the determination unit 120, the display control unit 140 determines that the shape of the user's hand has become the predetermined shape.

Furthermore, when causing the display device 60 to display a superimposed image, the display control unit 140 applies a transparency process on an image of the user's hand and adjusts the transparency so as to cause image data of a virtual space to be transparent. A transparency process performed by the display control unit 140 may be a process similar to the transparency of Portable Network Graphics (PNG) or the like, for example.

When the fingers of the user' hand are spread, the display control unit 140 adjusts the transparency of an image of the user's hand to a transparency T1. Conversely, when the fingers of the user' hand are not spread, the display control unit 140 sets the transparency of an image of the user's hand to a transparency T2. The relationship of the transparency T1 and the transparency T2 is defined such that the transparency T1 is greater than the transparency T2. This means that a greater transparency allows the image of the hand to transmit more image data of a virtual space. Note that, when the user's hand is not opened, no image of the user's hand is superimposed on a virtual space.

The display control unit 140 may adjust the transparency between the transparency T1 and a transparency T3 in accordance with the inclination of the user's hand. The relationship of the transparency T1 and the transparency T3 is defined such that the transparency T3 is greater than the transparency T1. The display control unit 140 adjusts the transparency toward the transparency T3 as the inclination of the user's hand increases and adjusts the transparency toward the transparency T1 as the inclination of the user's hand decreases. For example, the display control unit 140 utilizes an absolute value of a differential value between a distance for a fingertip point and a distance for a finger base point included in a hand region as the inclination of the hand. That is, as the user increases the inclination of the hand, the superimposed hand image becomes more transparent.

When the shape of the user's hand is the predetermined shape, the display control unit 140 calculates a viewpoint motion vector and moves the user's viewpoint position in the virtual space according to the viewpoint motion vector. An example of a process of calculating a viewpoint motion vector will be described below. A process of calculating a viewpoint motion vector includes a process of determining an orientation of a viewpoint motion vector and a process of determining a motion amount of the viewpoint motion vector.

A process of determining an orientation of a viewpoint motion vector by the display control unit 140 will be described. When information of a gesture recognition result includes information indicating that a hand region is inclined forward, the display control unit 140 determines that the orientation of the viewpoint motion vector is in a positive direction. As already described, when a value obtained by subtracting a distance for a finger base point from a distance for a fingertip point is a positive value, this means that the hand region is inclined forward.

When information of a gesture recognition result includes information indicating that a hand region is inclined backward, the display control unit 140 determines that the orientation of the viewpoint motion vector is in a negative direction. As already described, when a value obtained by subtracting a distance for a finger base point from a distance for a fingertip point is a negative value, this means that the hand region is inclined backward.

An example of a process of determining a motion amount of a viewpoint motion vector by the display control unit 140 will be described. The display control unit 140 determines a motion amount of a viewpoint motion vector based on an absolute value K of a differential value between a distance for a fingertip point and a distance for a finger base point included in a hand region. For example, the display control unit 140 calculates a motion amount X based on Equation (2). A value α included in Equation (2) is a coefficient preset by a user.

$$\text{Motion amount } X = \alpha \times K \qquad (2)$$

The display control unit 140 calculates a viewpoint motion vector by performing a process described above. The display control unit 140 moves a viewpoint position according to a viewpoint motion vector and determines image data on a virtual space in accordance with the moved viewpoint position. The display control unit 140 generates a superimposed image that superimposes image data on a virtual space with a hand image subjected to a transparency process, and causes the display device 60 to display the superimposed image.

Figure 9:
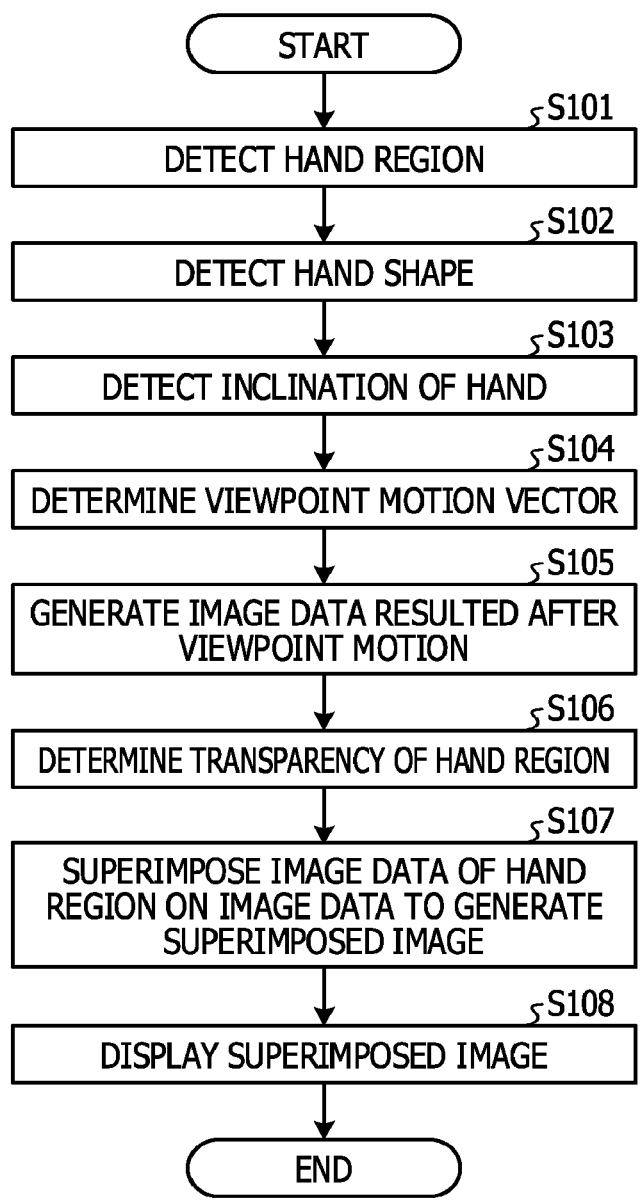
FIG. 9 is a flowchart illustrating process steps of the image processing device according to the embodiment.

Next, an example of process steps of the image processing device 100 according to the embodiment will be described. FIG. 9 is a flowchart illustrating process steps of the image processing device 100 according to the embodiment. The process illustrated in FIG. 9 is performed every time when the image processing device 100 acquires distance image information from the distance image sensor 50. As illustrated in FIG. 9, the determination unit 120 of the image processing device 100 detects a hand region (step S101).

The determination unit 120 detects a hand shape (step S102). The gesture recognition unit 130 of the image processing device 100 detects the inclination of the hand (step S103). The display control unit 140 of the image processing device 100 determines a viewpoint motion vector (step S104).

Based on the viewpoint motion vector, the display control unit 140 generates image data resulted after the viewpoint motion (step S105). The display control unit 140 determines the transparency of the hand region (step S106). The display control unit 140 superimposes image data of the hand region on the image data to generate a superimposed image (step S107). The display control unit 140 causes the display device 60 to display the superimposed image (step S108).

Figure 10:
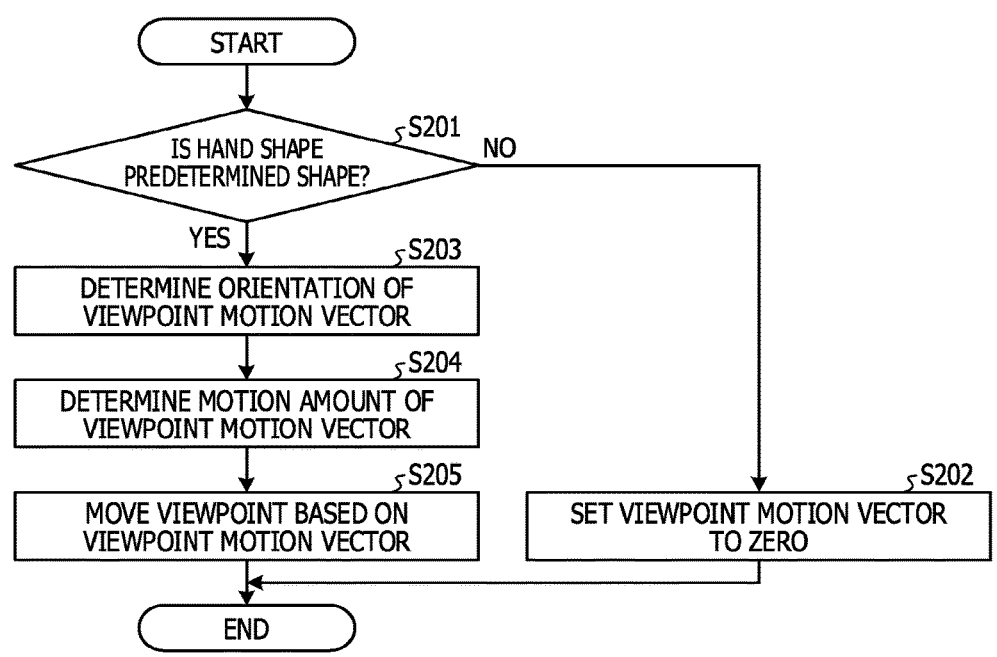
FIG. 10 is a flowchart illustrating process steps of determining a viewpoint motion vector.

Next, an example of a process of determining the viewpoint motion vector illustrated in step S104 of FIG. 9 will be described. FIG. 10 is a flowchart illustrating process steps of determining a viewpoint motion vector. As illustrated in FIG. 10, the display control unit 140 of the image processing device 100 determines whether or not a hand shape is a predetermined shape (step S201). When the hand shape is not a predetermined shape (step S201, No), the display control unit 140 sets the viewpoint motion vector to zero (step S202) and completes the process of determining a viewpoint motion vector.

On the other hand, when the hand shape is a predetermined shape (step S201 Yes), the display control unit 140 determines an orientation of the viewpoint motion vector (step S203). The display control unit 140 determines a motion amount of the viewpoint motion vector (step S204). The display control unit 140 moves the viewpoint position (step S205) and completes the process of determining a viewpoint motion vector.

Figure 11:
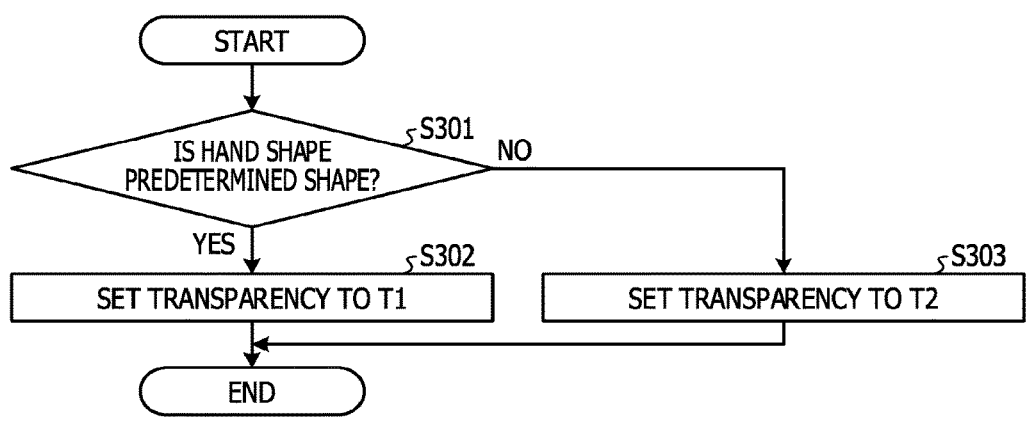
FIG. 11 is a flowchart illustrating process steps of determining a transparency of a hand region.

Next, an example of a process of determining a transparency of a hand region illustrated in step S106 of FIG. 9 will be described. FIG. 11 is a flowchart illustrating process steps of determining a transparency of a hand region. As illustrated in FIG. 11, the display control unit 140 of the image processing device 100 determines whether or not the hand shape is a predetermined shape (step S301). When the hand shape is not a predetermined shape (step S301, No), the display control unit 140 sets the transparency to T2 (step S303) and completes the process of determining a transparency.

On the other hand, when the hand shape is a predetermined shape (step S301 Yes), the display control unit 140 sets the transparency to T1 (step S302) and completes the process of determining a transparency.

Note that, although illustration is omitted in FIG. 9, the display control unit 140 may adjust the transparency between the transparency T1 and the transparency T3 in accordance with the inclination of the user's hand.

Next, the advantages obtained by the image processing device 100 according to the embodiment will be described. When an shape of the user's hand becomes a predetermined shape, the image processing device 100 causes the display device 60 to display a superimposed image that superimposes an image on a virtual space in accordance with a user's viewpoint position with an image of a hand region that has been subjected to a transparency process. Therefore, the user is able to make an intuitive operation by a gesture without a viewable area being obstructed.

The image processing device 100 further determines the inclination of the user's hand and, in accordance with the inclination of the hand, adjusts the transparency of an shape of the user's hand while moving the viewpoint position. For example, the transparency is adjusted such that a larger inclination of the user's hand results in a higher transparency, this adjustment allows the viewpoint to be moved with a viewable area being less obstructed even when a motion amount of a viewing point position is large.

The image processing device 100 adjusts a motion amount of a viewing point position in accordance with the inclination of the user's hand. Therefore, the user can adjust the motion amount only by operating the adjustment of the degree of inclination of the hand.

The process of image processing device 100 described above is a mere example, and the image processing device 100 may perform another process. Another process (1) and another process (2) of the image processing device 100 will be described below.

Another process (1) of the image processing device 100 will be described. As a result of an experiment by the inventors, it has been found that, when trying to turn a viewpoint position back to the front, the user may move the hand too close to the distance image sensor 50 and thus the image processing device 100 may be unable to recognize the shape of the user's hand. Even in such a case, in order to move the viewpoint position at the use's will, the display control unit 140 of the image processing device 100 moves the viewpoint position based on a preset viewpoint motion vector when an object is present within a predetermined distance from the distance image sensor 50. For example, the motion direction of a preset viewpoint motion vector is defined as "backward" and the motion amount is denoted as "motion amount Xa". The motion amount Xa is preset by the user.

Figure 12:
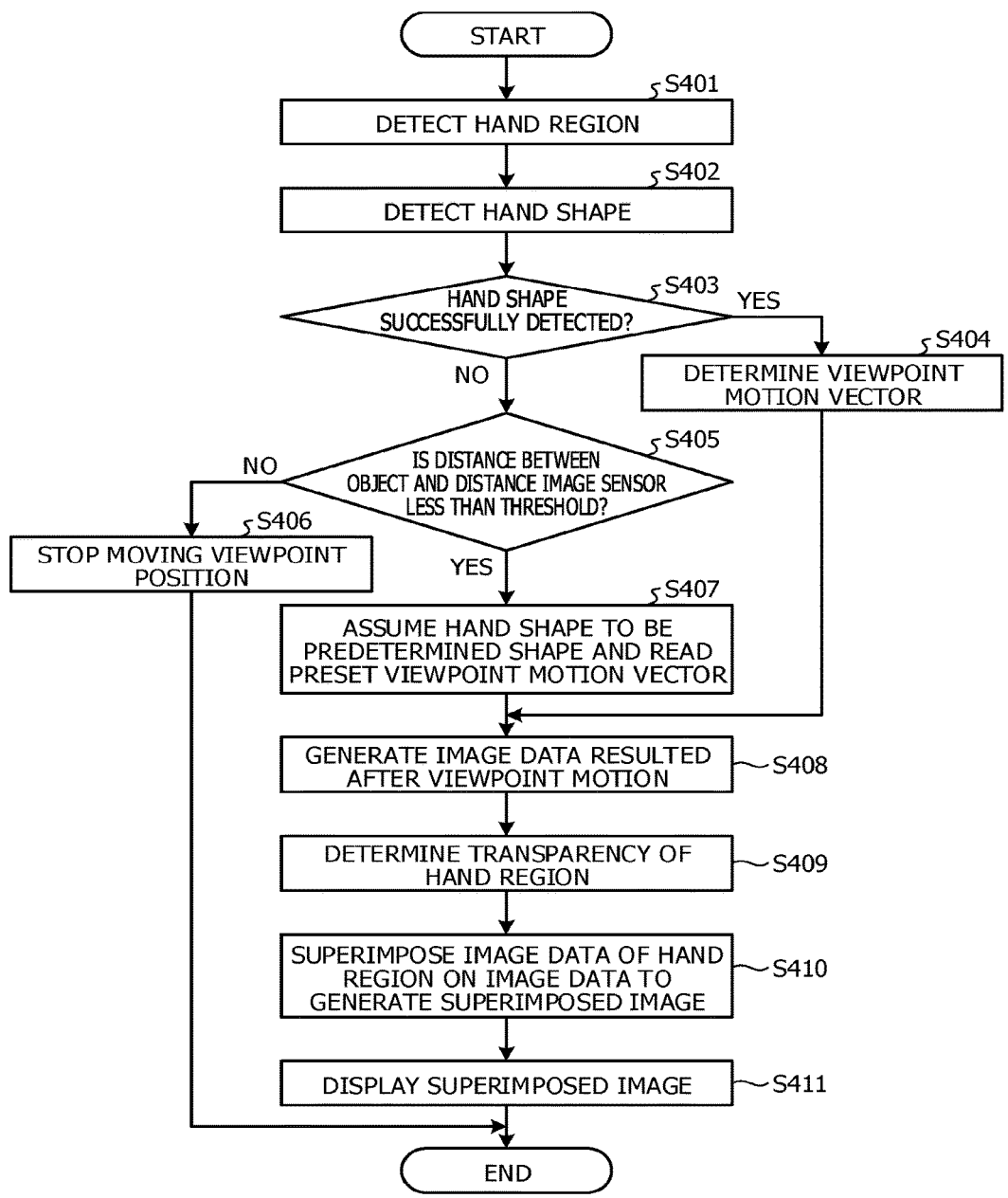
FIG. 12 is a flowchart illustrating another process (1) of the image processing device.

FIG. 12 is a flowchart illustrating another process (1) of the image processing device. The process illustrated in FIG. 12 is performed every time when the image processing device 100 acquires distance image information from the distance image sensor 50. As illustrated in FIG. 12, the determination unit 120 of the image processing device 100 detects a hand region (step S401).

The determination unit 120 detects a hand shape (step S402). The determination unit 120 determines whether or not a hand shape is successfully detected (step S403). If a hand shape is successfully detected (step S403, Yes), the display control unit 140 of the image processing device 100 determines a viewpoint motion vector (step S404) and step S408 is entered.

If a hand shape is not successfully detected (step S403, No), the determination unit 120 determines whether or not the distance between an object and the distance image sensor 50 is less than a threshold (step S405). If the determination unit 120 determines that the distance between the object and the distance image sensor 50 is not less than a threshold (step S405, No), the display control unit 140 stops moving the viewpoint position (step S406).

On the other hand, the determination unit 120 determines that the distance between the object and the distance image sensor 50 is less than a threshold (step S405, Yes), step S407 is entered. The display control unit 140 assumes that the hand shape is a predetermined shape and reads a preset viewpoint motion vector (step S407).

Based on the viewpoint motion vector, the display control unit 140 generates image data resulted after a viewpoint motion (step S408). The display control unit 140 determines a transparency of the hand region (step S409). The display control unit 140 superimposes image data of the hand region on the image data to generate a superimposed image (step S410). The display control unit 140 causes the display device 60 to display the superimposed image (step S411).

As described above, when the distance from the distance image sensor 50 to an object is less than a threshold, the display control unit 140 of the image processing device 100 assumes that the shape of the user's hand is a predetermined shape and moves the viewpoint position based on a preset viewpoint motion vector. Thus, even when the user's hand becomes too close to the distance image sensor 50, the user is able to move the viewpoint position backward at the user's will.

Another process (2) of the image processing device 100 will be described. As a result of an experiment by the inventors, it has been found that the user's hand may go out of a view angle of the distance image sensor 50 during the user's gesture and thus a motion of the viewpoint may stop against the user's will. In order to continue a smooth motion of the viewpoint even when the user's hand temporarily goes out of a view angle, the display control unit 140 of the image processing device 100 performs the following process.

The display control unit 140 again uses the previously determined viewpoint motion vector to move the viewpoint position when a part of a hand is out of a view angle of the distance image sensor 50. The display control unit 140 may use any scheme to determine whether or not a part of a hand is out of a view angle of the distance image sensor 50. For example, the display control unit 140 acquires the number of finger regions included in a hand region candidate from the determination unit 120 and, when the number of finger regions is greater than or equal to a predetermined number, determines that a part of a hand is out of a view angle of the distance image sensor 50.

Note that the display control unit 140 stores information of the determined viewpoint motion vector in a storage unit (not illustrated) every time when successfully detecting a hand shape and determining a viewpoint motion vector.

Figure 13:
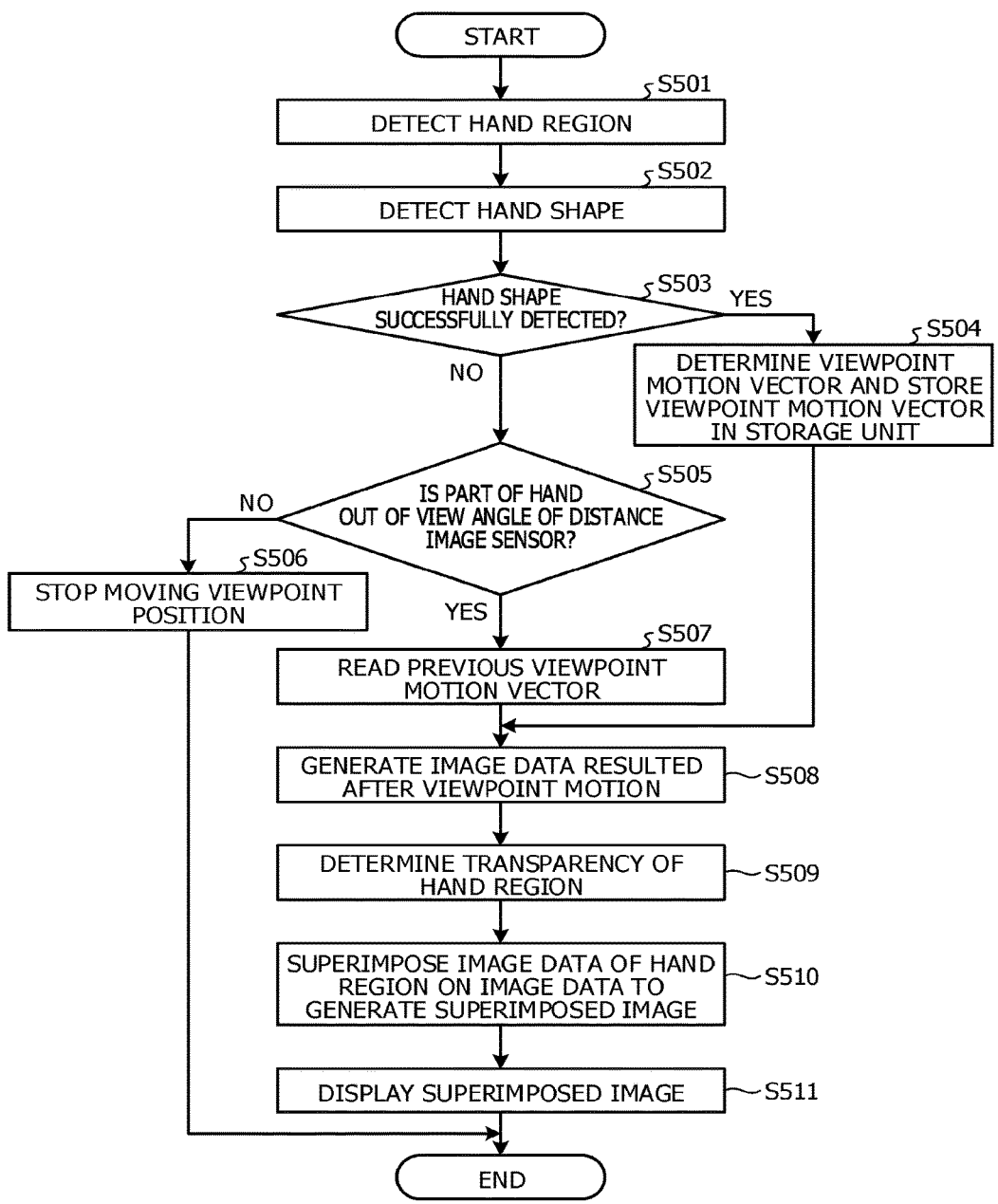
FIG. 13 is a flowchart illustrating another process (2) of the image processing device.

FIG. 13 is a flowchart illustrating another process (2) of the image processing device. The process illustrated in FIG. 13 is performed every time when the image processing device 100 acquires distance image information from the distance image sensor 50. As illustrated in FIG. 13, the determination unit 120 of the image processing device 100 detects a hand region (step S501).

The determination unit 120 detects a hand shape (step S502). The determination unit 120 determines whether or not a hand shape is successfully detected (step S503). If a hand shape is successfully detected (step S503, Yes), the display control unit 140 of the image processing device 100 determines a viewpoint motion vector and stores the viewpoint motion vector in a storage unit (step S504), and step S508 is entered.

On the other hand, if a hand shape is not successfully detected (step S503, No), the determination unit 120 determines whether or not a part of a hand is out of a view angle of the distance image sensor 50 (step S505). If a part of a hand is not out of a view angle of the distance image sensor 50 (step S505, No), the display control unit 140 stops moving the viewpoint position (step S506).

On the other hand, if a part of a hand is out of a view angle of the distance image sensor 50 (step S505, Yes), the display control unit 140 reads the previous viewpoint motion vector from the storage unit (step S507).

Based on the viewpoint motion vector, the display control unit 140 generates image data resulted after a viewpoint motion (step S508). The display control unit 140 determines a transparency of the hand region (step S509). The display control unit 140 superimposes image data of the hand region on the image data to generate a superimposed image (step S510). The display control unit 140 causes the display device 60 to display the superimposed image (step S511).

As described above, when a part of a hand is out of a view angle of the distance image sensor 50, the display control unit 140 of the image processing device 100 again uses a previously determined viewpoint motion vector to move a viewpoint position. This enables a smooth viewpoint motion to be continued even when the user's hand temporarily goes out of a view angle.

Figure 14:
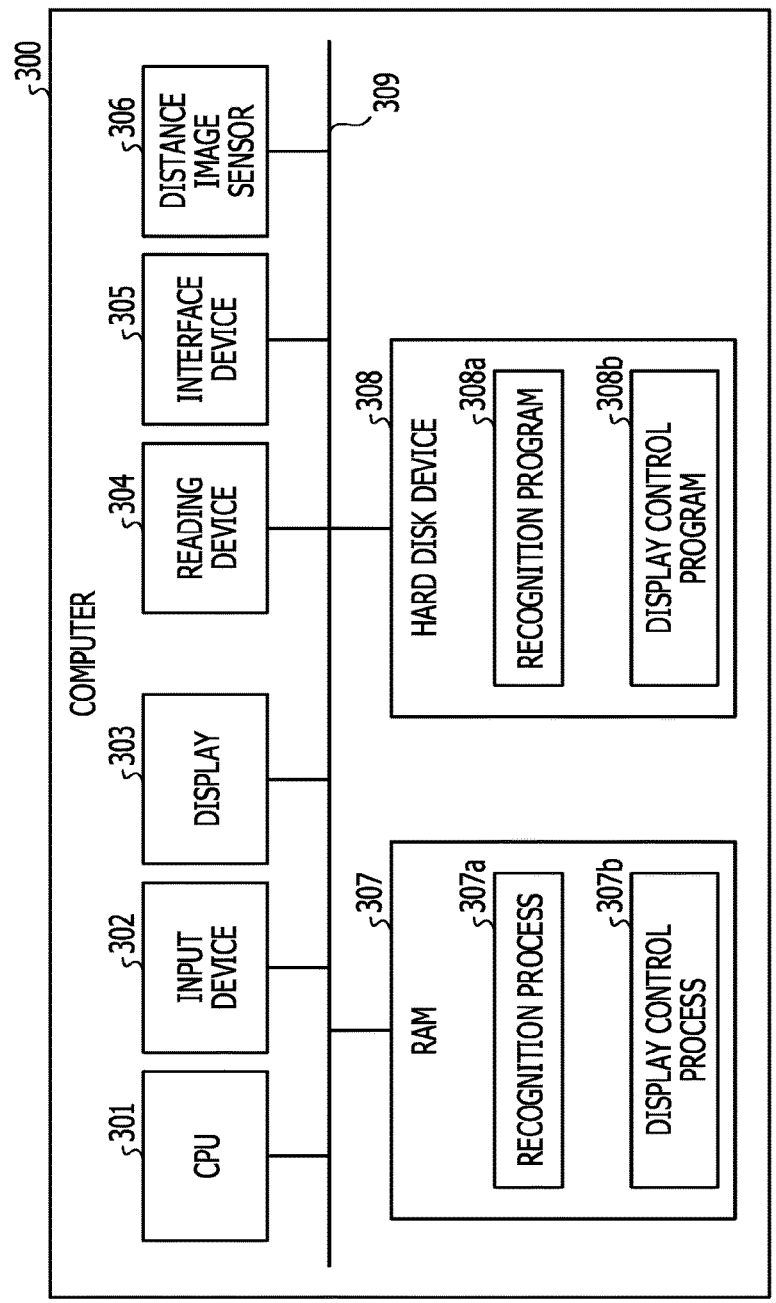
FIG. 14 is a diagram illustrating an example of a computer executing an image processing program.

Next, an example of a computer that executes an image processing program for implementing the same function as the image processing device 100 described in the above embodiment will be described. FIG. 14 is a diagram illustrating an example of a computer that executes an image processing program.

As illustrated in FIG. 14, a computer 300 has a CPU 301 that executes various operational processes, an input device 302 that accepts data entry by a user, and a display 303. Further, the computer 300 has a reading device 304 that reads a program or the like from a storage medium, an interface device 305 that transfers data to and from other computers via a network, and a distance image sensor 306. Further, the computer 300 has a RAM 307 that temporarily stores various information and a hard disk device 308. Each of the devices 301 to 308 is connected to a bus 309.

The hard disk device 308 has a recognition program 308a and a display control program 308b. The CPU 301 reads the recognition program 308a and the display control program 308b and expands them to the RAM 307.

The recognition program 308a functions as a recognition process 307a. The display control program 308b functions as a display control program 307b.

The processes of the recognition process 307a correspond to the processes of the acquisition unit 110, the determination unit 120, and the gesture recognition unit 130. The process of the display control process 307b corresponds to the process of the display control unit 140.

Note that the recognition program 308a and the display control program 308b may not necessarily be stored in advance in the hard disk device 308. For example, each program may be stored in a "portable physical medium" such as a floppy disk (FD), a CD-ROM, a DVD disk, a magneto-optical disk, an IC card, or the like that can be inserted in the computer 300. The computer 300 may then read and execute each of the programs 308a and 308b.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A head mounted display (HMD) device, comprising:
    a display;
    a distance image sensor that includes a camera configured to capture an image in a capturing range, the distance image sensor configured to acquire distance information indicating a distance from the distance image sensor to a hand of a user wearing the HMD device and output distance image information that combines the captured image and the acquired distance information; and
    a processor configured to:
        extract an image of the hand of the user from the captured image based on the distance image information,
        specify a shape of the hand from the image of the hand,
        calculate an inclination of the hand based on the distance information corresponding to the image of the hand,
        determine whether the specified shape is a predetermined shape,
        determine a viewpoint motion vector for moving a viewpoint position of the user in a virtual space when it is determined that the specified shape is a predetermined shape,
        generate image data after the viewpoint position is moved,
        determine a transparency of the image of the hand based on the calculated inclination,
        generate an superimpose image by superimposing the image of the hand on the generated image data, and
        control the display to display the generated superimpose image.

2. The HMD device according to claim 1, wherein the display is a non-transmissive display.

3. The HMD device according to claim 1, wherein
    the display is configured to display video, and
    the processor is further configured to:
        generate a partial image corresponding to the hand region from the image, and
        control the display to display the partial image superimposed on the video.

4. The HMD device according to claim 3, wherein the partial image is displayed transparently on the video.

5. The HMD device according to claim 4, wherein when the shape of the hand is a second shape that is different from the predetermined shape, the processor is configured to control the display to display the partial image on another image within the video in which the viewpoint position has not been moved.

6. The HMD device according to claim 5, wherein when the shape of the hand is the predetermined shape, the hand is in an open state and fingers of the hand are spread apart from one another.

7. The HMD device according to claim 5, wherein when the shape of the hand is the second shape, the hand is in an open state and fingers of the hand are not spread apart from one another.

8. The HMD device according to claim 5, wherein the transparency of the partial image when the shape of the hand is the predetermined shape is greater than the transparency of the partial image when the shape of the hand is the second shape.

9. The HMD device according to claim 1, wherein the processor is further configured to:
    determine a first reference point corresponding to a fingertip of a finger of the hand based on the hand image,
    determine a second reference point corresponding to a finger base of the finger of the hand based on the hand image, and
    identify the inclination of the hand based on the first reference point and the second reference point.

10. The HMD device according to claim 9, wherein the inclination of the hand is based on a first distance from the distance image sensor to the first reference point, and a second distance from the distance image sensor to the second reference point.

11. The HMD device according to claim 10, wherein the processor is configured to:
    determine that the hand is inclined forward when the first distance is greater than the second distance, and
    determine that the hand is inclined backward when the first distance is less than or equal to the second distance.

12. The HMD device according to claim 1, wherein
    the image data is generated in accordance with the viewpoint motion vector.

13. The HMD device according to claim 1, wherein
    the viewpoint motion vector is for moving the virtual viewpoint position in the forward direction when the hand is inclined forward, and
    the viewpoint motion vector is for moving the virtual viewpoint position in a backward direction when the hand is inclined backward.

14. The HMD device according to claim 1, wherein the processor is configured to determine a length of the viewpoint motion vector in accordance with a degree of the inclination.

15. The HMD device according to claim 1, wherein the processor is configured to determine, as the hand, a region where a distance from the distance image sensor is less than or equal to a threshold in the distance information.

16. The HMD device according to claim 1, wherein the processor is configured to obtain the inclination of the hand by calculating an absolute value of a differential value between a distance for a fingertip point and a distance for a finger base point included in a region of the hand.

17. The HMD device according to claim 1, wherein the image of the hand included in the superimpose image is based on the determined transparency.

18. A control method executed by a head mounted display (HMD) device that includes a display, a distance image sensor that includes a camera, and a processor, the control method comprising:

capturing, by the camera, an image in a capturing range;

acquiring, by the distance image sensor, distance information indicating a distance from the distance image sensor to a hand of a user wearing the HMD device;

outputting, by the distance image sensor, distance image information that combines the captured image and the acquired distance information;

extracting, by the processor, an image of the hand of the user from the captured image based on the distance image information;

specifying a shape of the hand from the image of the hand;

calculating an inclination of the hand based on the distance information corresponding to the image of the hand;

determining whether the specified shape is a predetermined shape;

determining a viewpoint motion vector for moving a viewpoint position of the user in a virtual space when it is determined that the specified shape is a predetermined shape;

generating image data after the viewpoint position is moved;

determining a transparency of the image of the hand based on the calculated inclination;

generating an superimpose image by superimposing the image of the hand on the generated image data; and controlling the display to display the generated superimpose image.

19. A non-transitory computer-readable recording medium storing a program that causes a processor included in a head mounted display (HMD) device to execute a process, the HMD device including a display, a distance image sensor that includes a camera, the process comprising:

extracting an image of a hand of a user from an image captured by the camera based on distance information acquired by the distance image sensor;

specifying a shape of the hand from the image of the hand;

calculating an inclination of the hand based on the distance information corresponding to the image of the hand;

determining whether the specified shape is a predetermined shape;

determining a viewpoint motion vector for moving a viewpoint position of the user in a virtual space when it is determined that the specified shape is a predetermined shape;

generating image data after the viewpoint position is moved;

determining a transparency of the image of the hand based on the calculated inclination;

generating an superimpose image by superimposing the image of the hand on the generated image data; and controlling the display to display the generated superimpose image.

* * * * *